(12) United States Patent
Zhou et al.

(10) Patent No.: US 11,891,228 B2
(45) Date of Patent: Feb. 6, 2024

(54) AUTOMATIC SUCTION SEALING BOX AND WORKING METHOD THEREOF

(71) Applicant: CHANGZHOU BESTFULL MOULD & PLASTICS CO., LTD, Liyang (CN)

(72) Inventors: Tianyi Zhou, Liyang (CN); Jiancai Yang, Liyang (CN); Pingping Lv, Liyang (CN); Caixia Chen, Liyang (CN)

(73) Assignee: CHANGZHOU BESTFULL MOULD & PLASTICS CO., LTD, Liyang (CN)

( * ) Notice: Subject to any disclaimer, the term of this patent is extended or adjusted under 35 U.S.C. 154(b) by 1210 days.

(21) Appl. No.: 16/513,596

(22) Filed: Jul. 16, 2019

(65) Prior Publication Data

US 2020/0156848 A1    May 21, 2020

(30) Foreign Application Priority Data

Nov. 19, 2018 (CN) .......................... 201821898495.4

(51) Int. Cl.
| | |
|---|---|
| *B65D 81/20* | (2006.01) |
| *G01L 19/14* | (2006.01) |
| *B65D 51/16* | (2006.01) |
| *G05B 19/042* | (2006.01) |
| *G06F 3/041* | (2006.01) |

(Continued)

(52) U.S. Cl.
CPC ..... *B65D 81/2038* (2013.01); *B65D 51/1644* (2013.01); *B65D 51/245* (2013.01); *G01L 19/147* (2013.01); *G05B 19/042* (2013.01); *G05B 19/0426* (2013.01); *B65D 2547/00* (2013.01); *G05B 2219/25252* (2013.01); *G06F 3/0412* (2013.01); *G06F 3/0416* (2013.01); *G09G 3/36* (2013.01); *G09G 2354/00* (2013.01)

(58) Field of Classification Search
CPC ................ B65D 51/1644; B65D 81/24; B65D 81/2038; B65D 51/245; G01L 19/147; G05B 19/0426; G05B 19/042
USPC ............................... 99/472, 467; 220/203.01
See application file for complete search history.

(56) References Cited

U.S. PATENT DOCUMENTS

| | | | |
|---|---|---|---|
| 4,243,349 A * | 1/1981 | Hickey | ................. B65D 19/44 200/83 W |
| 7,571,748 B2 * | 8/2009 | Shao | ....................... B65B 31/00 206/524.8 |

(Continued)

*Primary Examiner* — Rafael A Ortiz
(74) *Attorney, Agent, or Firm* — Dragon Sun Law Firm, PC; Nathaniel Perkins

(57) ABSTRACT

Provided is an automatic air-extracting sealing box cover, comprising a bottom cover and a top cover that are mutually detachably connected, wherein the bottom cover and the bottom cover are connected to form a device chamber, and an automatic air extracting apparatus is mounted in the device chamber; the automatic air-extracting apparatus comprises a power source, a pressure sensor, an air pump, and a controller; the power source is connected to power source input ends of the pressure sensor, the air pump and the controller; an air extracting opening of the air pump and a probe of the pressure sensor project out of a lower surface of the bottom cover; an output end of the pressure sensor is connected to a collection circuit, and an output end of the collection circuit is connected to an input end of the controller; a control signal output end of the controller is connected an on/off control end of the air pump.

11 Claims, 6 Drawing Sheets

(51) Int. Cl.
*G09G 3/36* (2006.01)
*B65D 51/24* (2006.01)

(56) References Cited

U.S. PATENT DOCUMENTS

| | | | |
|---|---|---|---|
| 7,931,052 B2* | 4/2011 | Schooley | B65D 81/2015 141/8 |
| 2004/0099332 A1* | 5/2004 | Kieck | A47J 47/12 141/65 |
| 2007/0272325 A1* | 11/2007 | Tsay | B01J 3/03 141/65 |
| 2008/0131567 A1* | 6/2008 | Lemme | F04B 35/04 426/418 |

* cited by examiner

AUTOMATIC SUCTION SEALING BOX AND WORKING METHOD THEREOF

CROSS-REFERENCE TO RELATED APPLICATIONS

This Application claims priority from CN Application No. 201821898495.4, filed Nov. 19, 2018 and CN Application No. 201910234522.0, filed Mar. 26, 2019, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure relates to the field of storage technology, and in particular to an automatic air-extracting sealing box cover and a working method of thereof.

BACKGROUND in the prior art, when articles such as easy-to-oxidize articles and foods are stored at a normal temperature or a low temperature, it is preferred to extract vacuum or inject an inert gas under a sealing condition. For conveniences of operation and monitoring, it is more advisable to extract vacuum in most cases. At present, there exists a sealing box that extracts vacuum with a manual air pump, and its working principle is that a manual air pump with an air pressure gauge is fixed or detachably connected on the sealing box. This structure is convenient in general storage condition because people frequently observe the sealing box in a storage state so that air can be extracted when a pressure deviates from a requirement (air leakage or the like occurs in general cases). However, under the storage condition of many sealing boxes, a keeper cannot find an abnormal pressure in time during a patrol inspection or sampling inspection and so on.

Therefore, a heretofore unaddressed need exists in the art to address the aforementioned deficiencies and inadequacies.

SUMMARY

To overcome the above problems existing in the prior art, the present disclosure provides a new automatic air-extracting sealing box cover and a working method thereof.

The automatic air-extracting sealing box cover includes a bottom cover and a top cover that are mutually detachably connected; the bottom cover and the top cover are connected to form a device chamber in which an automatic air-extracting apparatus is mounted.

The automatic air-extracting apparatus includes a power source, a pressure sensor, an air pump and a controller; the power source is connected to power source input ends of the pressure sensor, the air pump and the controller; an air extracting opening of the air pump and a probe of the pressure sensor are located in the storage chamber (in a use state, the box cover is covered on a box body so that the box cover and the box body enclose a storage chamber); an output end of the pressure sensor is connected to a collection circuit and an output end of the collection circuit is connected to a pressure signal input end of the controller; a control signal output end of the controller is connected to an on/off control end of the air pump (a medical air pump may be used).

The collection circuit includes a first operational amplifier and a second operation amplifier; a first signal output end and a second signal output end of the pressure sensor are connected respectively to in-phase ends of the first operational amplifier and the second operational amplifier and out-phase ends of the first operational amplifier and the second operational amplifier are connected respectively to output ends of the first operational amplifier and the second operational amplifier; the output ends of the first operational amplifier and the second operational amplifier are connected in series respectively to a first voltage dropping resistor and a second voltage dropping resistor and then connected to an out-phase end and an in-phase end of a third operational amplifier respectively, an output end of the third operational amplifier is connected in series to a third voltage dropping resistor and then connected to the pressure signal input end of the controller; a RC parallel circuit is provided between the out-phase end and the output end of the third operational amplifier; an output end of a fourth operational amplifier is connected in series to a fourth voltage dropping resistor and then connected to the in-phase end of the third operational amplifier, and an out-phase end and the output end of the fourth operational amplifier are connected; a first voltage dividing resistor and a second voltage dividing resistor are connected in series between a +2.5V direct current power source end and a grounding end, and an in-phase end of the fourth operational amplifier is connected to connecting ends of the first voltage dividing resistor and the second voltage dividing resistor.

The controller is a single chip microcomputer (preferably 51 series single chip microcomputer) and connected with a touch display screen; the touch display screen includes a liquid crystal screen driving circuit connected with the above controller, a liquid crystal screen connected with an output end of the liquid crystal screen driving circuit and a touch controller connected with a touch control signal input end of the liquid crystal screen.

The controller controls the air pump through an MOS tube switching circuit.

A human-machine interaction module is also included. A signal output end of the human-machine interaction module is connected to a human-machine interaction signal input end of a microcontroller; a signal input end of the human-machine interaction module is connected to a human-machine interaction signal output end of a microcontroller. The human-machine interaction module may be a touch screen.

A communication unit is also included. A signal output end of the communication unit is connected to a communication signal input end of the microcontroller; a signal input end of the communication unit is connected to a communication signal output end of the microcontroller; the output end of the power source is connected to a power source input end of the communication unit; the communication unit is a Bluetooth communication module and/or a WIFI communication module.

An upper surface of the bottom cover is provided with a grid for placing the pressure sensor body, a bottom surface of the grid is provided with a through hole, and the probe of the pressure sensor communicates with the storage chamber through the through hole. The grid is filled with a pouring sealant and a wire of the pressure sensor protrudes out of the pouring sealant body.

The upper surface of the bottom cover is provided with a fixing position for placing the air pump. The air pump is fixed in the fixing position and an elastic isolation pad is connected between a housing of the air pump and the fixing position.

The human-machine interaction module is a touch display screen; a hollow frame is opened on the top cover, the touch display screen is located in the hollow frame, an elastic sealing material is filled between an edge of the touch display screen an inner edge of the hollow frame.

A PCB board where the controller is located is fixed on the upper surface of the bottom cover.

The power source is a battery which may be detachably connected into a positioning groove of the upper surface of the bottom cover.

In an engineering implementation, the upper surface of the bottom cover is provided with a plurality of stiffeners and a grid formed by the stiffeners may be used as a grid, a fixing position, a positioning groove and so on for placing electrical devices as above.

An edge of the top cover is provided with an annular groove with an opening facing down, an edge of the bottom cover is provided with an annular protruding ridge facing up and the protruding ridge is correspondingly mounted in the groove. A circle of expansion water-resistant filling rope is filled in the bottom of the groove, and a sealing rubber ring is mounted outside the expansion water-resistant filling rope.

The protruding ridge is provided with a horizontal protruding block and a hole corresponding to the protruding block is opened on a wall of the groove. In the connecting state of the bottom cover and the top cover, the protruding block is located in the hole.

A pressure relief mechanism is also connected on the box cover. The pressure relief mechanism includes an electromagnetic valve and a pressure relief air tube; an air inlet of the pressure relief air tube communicates with the storage chamber, and an air outlet of the pressure relief air tube communicates with the atmosphere; the electromagnetic valve is connected to the pressure relief air tube and the controller controls the electromagnetic valve to be turned on and off through the MOS tube switching circuit.

Alternatively, the pressure relief mechanism includes a shell, an air bubble film, a film fixing block, a first venting column, a compression spring and a second venting column.

The shell is connected to the box cover, a top end of the shell exposes at the upper surface of the top cover and a bottom end of the shell is located at the lower surface of the bottom cover.

The cavity of the shell is a cylindrical cavity, and both ends of the cylindrical cavity are provided with a first through hole and a second through hole; the cylindrical cavity communicates with the storage chamber through the first through hole and communicates with the atmosphere through the second through hole.

The second venting column runs through the first through hole of the cylindrical cavity into the cylindrical cavity, the first venting column runs through the second through hole into the cylindrical cavity, the top end of the second venting column is fixed at the bottom end of the first venting column and a venting hole penetrating through the first venting column and the second venting column is opened in the first venting column and the second venting column.

A lower outer wall of the second venting column is provided with a first annular protruding ridge, the outer diameter of the first annular protruding ridge is greater than the inner diameter of the first through hole, a sealing structure is arranged between the first annular protruding ridge and the first through hole, and the first annular protruding ridge is located outside the cylindrical cavity; the compression spring is connected between the second venting column and the cylindrical cavity; a gap is left between the outer wall of the second venting column and the inner wall of the cylindrical cavity.

An opening end of the second through hole is connected with a bending edge facing an axis of the cylindrical cavity, and an inner diameter of a circular through hole enclosed by the bending edge is less than the inner diameter of the cylindrical cavity.

A second annular protruding ridge is connected at a lower outer wall of the first venting column, the second annular protruding ridge is located in the cylindrical cavity and a sealing structure is connected between a top surface of the second annular protruding ridge and a bottom surface of the bending edge.

An outer diameter of the first venting column is less than the inner diameter of the circular through hole, and an outer diameter of the second annular protruding ridge is less than the inner diameter of the cylindrical cavity and greater than the inner diameter of the circular through hole.

The air bubble film is covered on a top surface of the first venting column, the top surface of the first venting column is provided with a recess and an opening of the venting hole is located on the surface of the recess, and a gap is left between the bottom surface of the air bubble film and the surface of the recess; the film fixing block is annular, the film fixing block is pressed on the edge of the air bubble film and the edge of the air bubble film is sealingly connected with the recess.

The air bubble film is an elastic film made of an elastic material. In a normal state, the air bubble film bulges in the middle. When a bottom surface pressure of the air bubble film is less than a top surface pressure, the air bubble film is recessed in the middle; the middle position of the air bubble film is in the hollow of the annular film fixing block.

When the elastic potential energy of the compression spring is minimum, sealing is performed between the first annular protruding ridge and the first through hole and sealing is performed between the second annular protruding ridge and the bottom surface of the bending edge.

An automatic air-extracting sealing box using the above box cover includes a box body and a box cover, where a bottom cover and the box body are sealingly and detachably connected, and a sealing ring is arranged at the connection of the box body and the box cover; the box body and the box cover are connected to form a storage chamber.

The working method of the sealing box cover is characterized in that: when a motor is started and a pressure reaches a set upper limit, the sealing box cover automatically stops; when the pressure reaches a set lower limit, the sealing box cover automatically runs the air pump until the pressure reaches the upper limit.

The present disclosure may realize automatic pressure measuring and air suction to ensure an air pressure value in the storage chamber.

BRIEF DESCRIPTION OF DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

Figure 1:
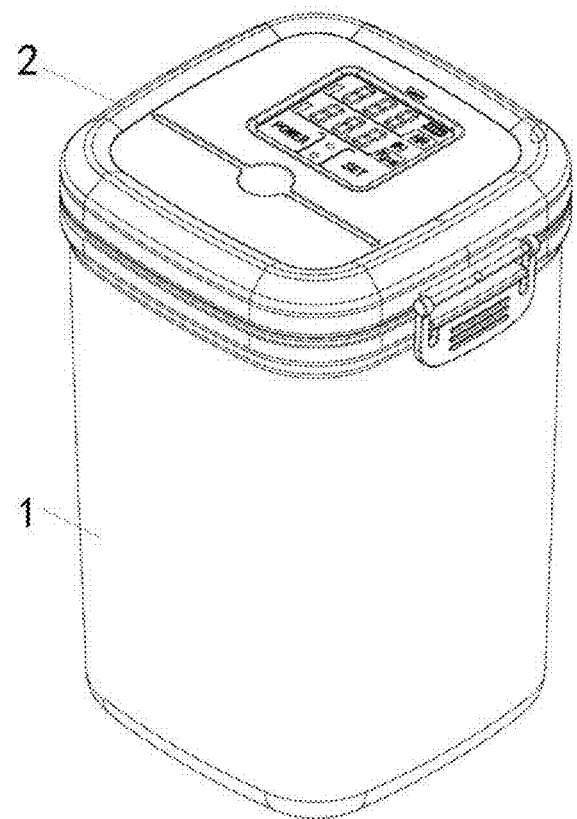
FIG. 1 is a schematic diagram illustrating an automatic air-extracting sealing box according to an example of the present disclosure.
Figure 2:
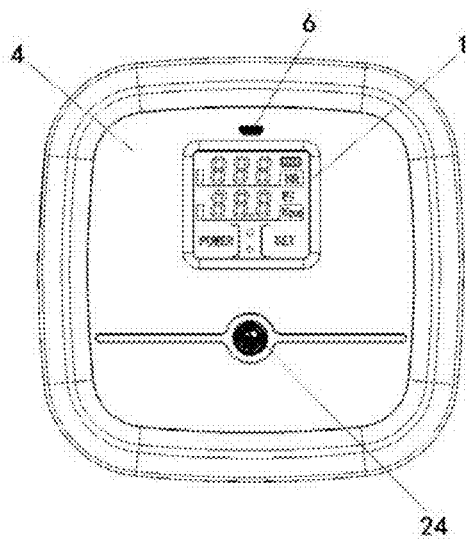
FIG. 2 is a top view illustrating an automatic air-extracting sealing box cover according to an example of the present disclosure.
Figure 3:
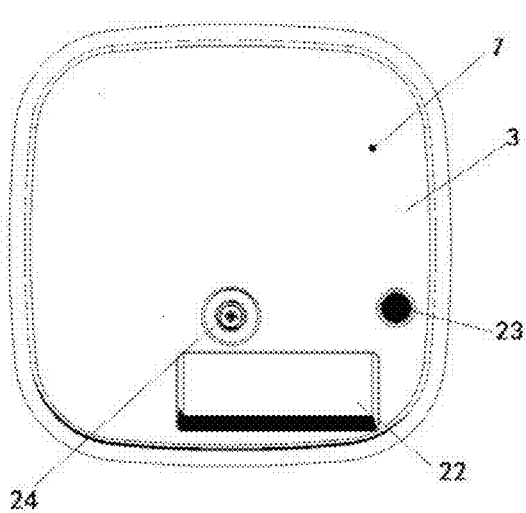
FIG. 3 is a bottom view illustrating an automatic air-extracting sealing box cover according to an example of the present disclosure.
Figure 4:
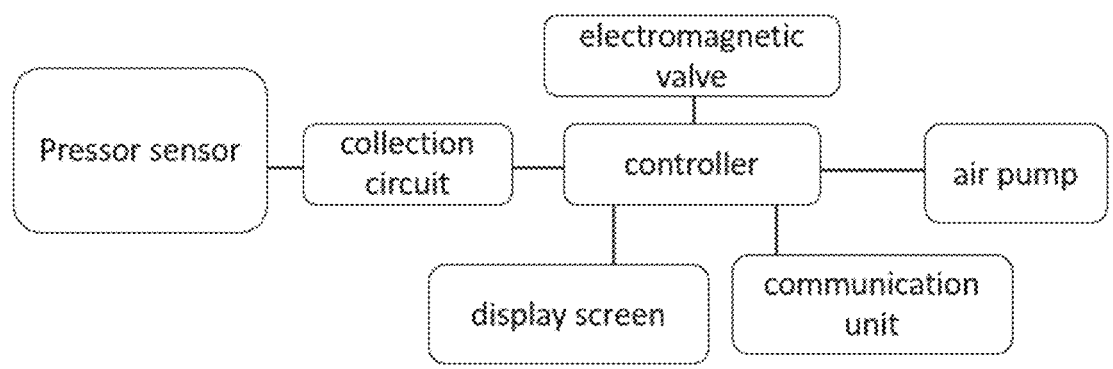
FIG. 4 is a block diagram illustrating an electric principle according to an example of the present disclosure (for clear illustration, an electromagnetic valve of an electrically-driven pressure relief mechanism is included in the principle diagram).
Figure 5:
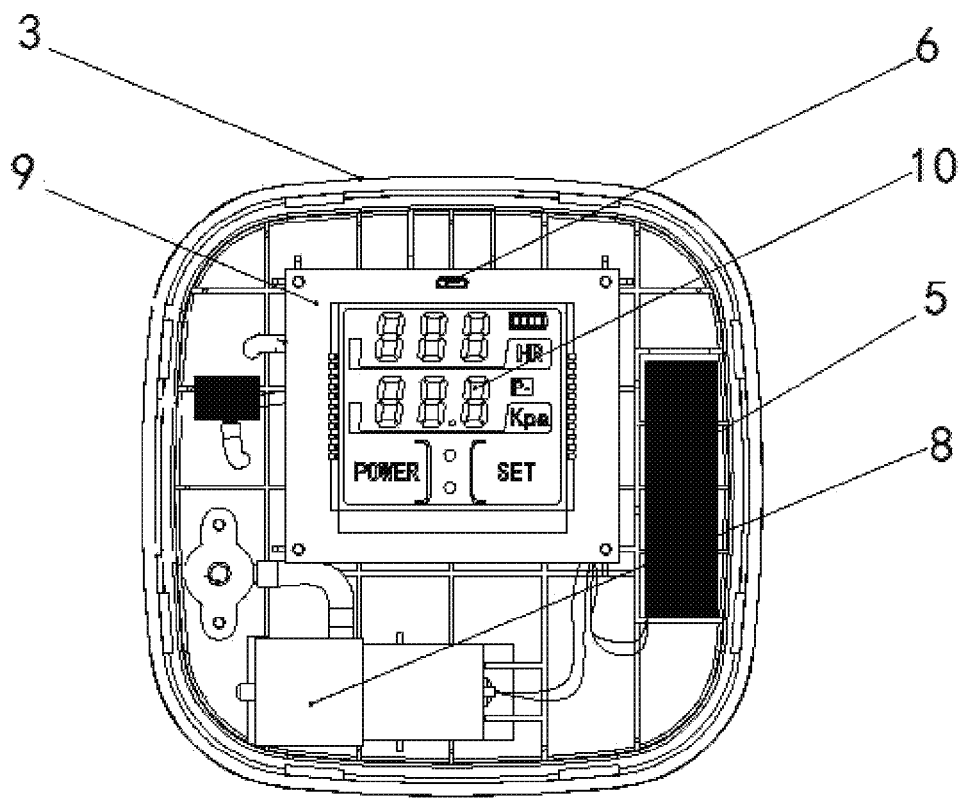
FIG. 5 is a schematic diagram positions of different electric devices on an upper surface of a bottom cover according to an example of the present disclosure.

In the drawings, 1 is a box body, 2 is a box cover, 3 is a bottom cover, 4 is a top cover, 5 is a power source (a chargeable battery), 6 is a charging terminal of a battery, 7 is a through hole where a probe of a pressure sensor is located, 8 is an air pump, 9 is a PCB board, 10 is a touch display screen, 11 is a sealing ring, 12 is an air bubble film, 13 is a film fixing block, 14 a first venting column, 15 is a compression spring, 16 is a second venting column, 17 is a cylindrical cavity, 18 is a venting hole, 19 is a first annular protruding ridge, 20 is a bending edge, 21 is a second annular protruding ridge, 22 is a downward protrusion formed at a lower surface of a bottom cover where the battery is located, 23 is a position of an air extracting opening of an air pump (a one-way valve flap is mounted at the air extracting opening), 24 is the position of a pressure relief mechanism in an example, 25 is a groove of an edge of a top cover, 26 is a protruding ridge of an edge of a bottom cover, 27 is an expansion water-resistant filling rope, 28 is a sealing rubber ring, 29 is a protruding block, and 30 is a hole corresponding to a protruding block.

DETAILED DESCRIPTION

The present disclosure will be further described in combination with the accompanying drawings and specific examples.

Example 1

As shown in FIG. 1, an automatic air-extracting sealing box includes a box body and a box cover, where the box body and the box cover are detachably connected, and a sealing ring is arranged at the connection of the box body and the box cover; the box body and the box cover are connected to form a storage chamber. In the example, the box body and the box cover may also be connected through a folding lug.

As shown in FIGS. 2-5, an automatic air-extracting apparatus is included. The apparatus includes a power source, a pressure sensor, an air pump and controller, where the power source is connected to power source input ends of the pressure sensor, the air pump (a miniature air pump is preferred) and the controller; a probe of the pressure sensor is located in the storage chamber; an output end of the pressure sensor is connected to a collection circuit and an output end of the collection circuit is connected to a pressure signal input end of the controller; a control signal output end of the controller is connected to a on/off control end of the air pump.

The collection circuit includes a first operational amplifier IC11 and a second operational amplifier IC12; a first signal output end and a second signal output end of a pressure sensor IC3 are connected respectively to in-phase ends of the first operational amplifier and the second operational amplifier, out-phase ends of the first operational amplifier and the second operational amplifier are connected respectively to output ends of the first operational amplifier and the second operational amplifier; the output ends of the first operational amplifier and the second operational amplifier are connected in series respectively to a first voltage dropping resistor R13 and a second voltage dropping resistor R14 and then connected to an out-phase end and an in-phase end of a third operational amplifier, and an output end of the third operational amplifier is connected in series to a third voltage dropping resistor R20 and then connected to the pressure signal input end of the controller; an RC parallel circuit (respectively corresponding to the resistor R11 and a capacitor C11) is provided between the out-phase end and an output end of the third operational amplifier IC13; an output end of a fourth operational amplifier IC14 is connected in series to a fourth voltage dropping resistor R12 and then connected to the in-phase end of the third operational amplifier, and an out-phase end and the output end of the fourth operational amplifier IC14 are connected; a first voltage dividing resistor and a second voltage dividing resistor (corresponding to a resistor R22 and a resistor R19 respectively) are connected in series between +2.5V direct current power source end and a grounding end, and an in-phase end of the fourth operational amplifier IC14 is connected to connecting ends of the first voltage dividing resistor and the second voltage dividing resistor.

The controller is a single chip microcomputer IC7 (51 series single chip microcomputer is preferred). The controller is connected with a touch display screen; the touch display screen includes a liquid crystal screen driving circuit (adopt an integrated circuit IC2 with model as TM1621C) connected with the above controller, a liquid crystal screen IC4 (adopt Youda 10.1 inch display screen—model G101STN01.D) connected with an output end of the liquid crystal screen driving circuit and a touch controller IC5 (models available include GT9147, FT3206 or CY8CTST110 or the like) connected with a touch control signal input end of the liquid crystal screen.

The controller controls the air pump through an MOS tube switching circuit.

A human-machine interaction module is also included. A signal output end of the human-machine interaction module is connected to a human-machine interaction signal input end of a microcontroller; a signal input end of the human-machine interaction module is connected to a human-machine interaction signal output end of the microcontroller.

A communication unit is also included. A signal output end of the communication unit is connected to a communication signal input end of the microcontroller; a signal input end of the communication unit is connected to a communication signal output end of the microcontroller; the output end of the power source is connected to a power source input end of the communication unit.

The communication unit is a Bluetooth communication module and/or a WIFI communication module.

The box cover includes a bottom cover and a top cover that are mutually detachably connected; the bottom cover and the top cover are connected to form a device chamber in which an automatic air-extracting apparatus is mounted; the bottom cover and the box body are detachably and sealingly connected.

An upper surface of the bottom cover is provided with a grid for placing the pressure sensor body, a bottom surface of the grid is provided with a through hole, and the probe of the pressure sensor communicates with the storage chamber through the through hole. The grid is filled with a pouring sealant and a wire of the pressure sensor protrudes out of the pouring sealant body.

The upper surface of the bottom cover is provided with a fixing position for placing the air pump. The air pump is fixed in the fixing position and an elastic isolation pad is connected between a housing of the air pump and the fixing position.

The human-machine interaction module is a touch display screen; a hollow frame is opened on the top cover, the touch display screen is located in the hollow frame, and an elastic sealing material is filled between an edge of the touch display screen an inner edge of the hollow frame.

A PCB board where the controller is located is fixed on the upper surface of the bottom cover.

The power source is a battery which may be detachably connected into a positioning groove of the upper surface of the bottom cover.

Figure 7:
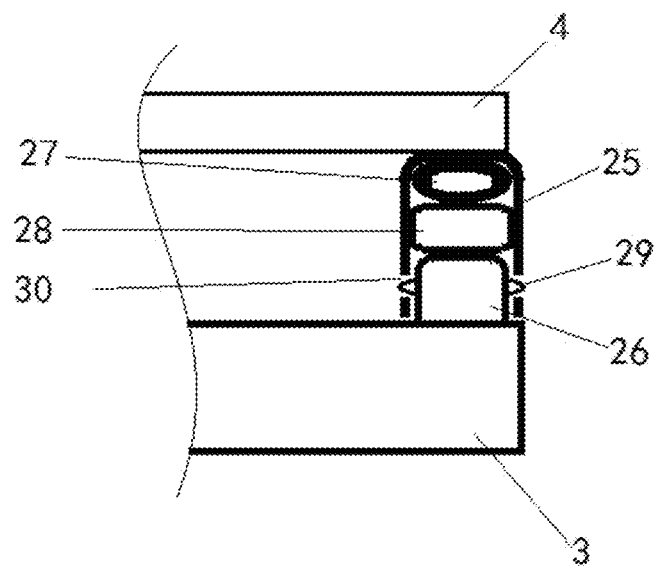
FIG. 7 is a schematic diagram illustrating a connection structure of a top cover and a bottom cover according to an example of the present disclosure.
Figure 8:
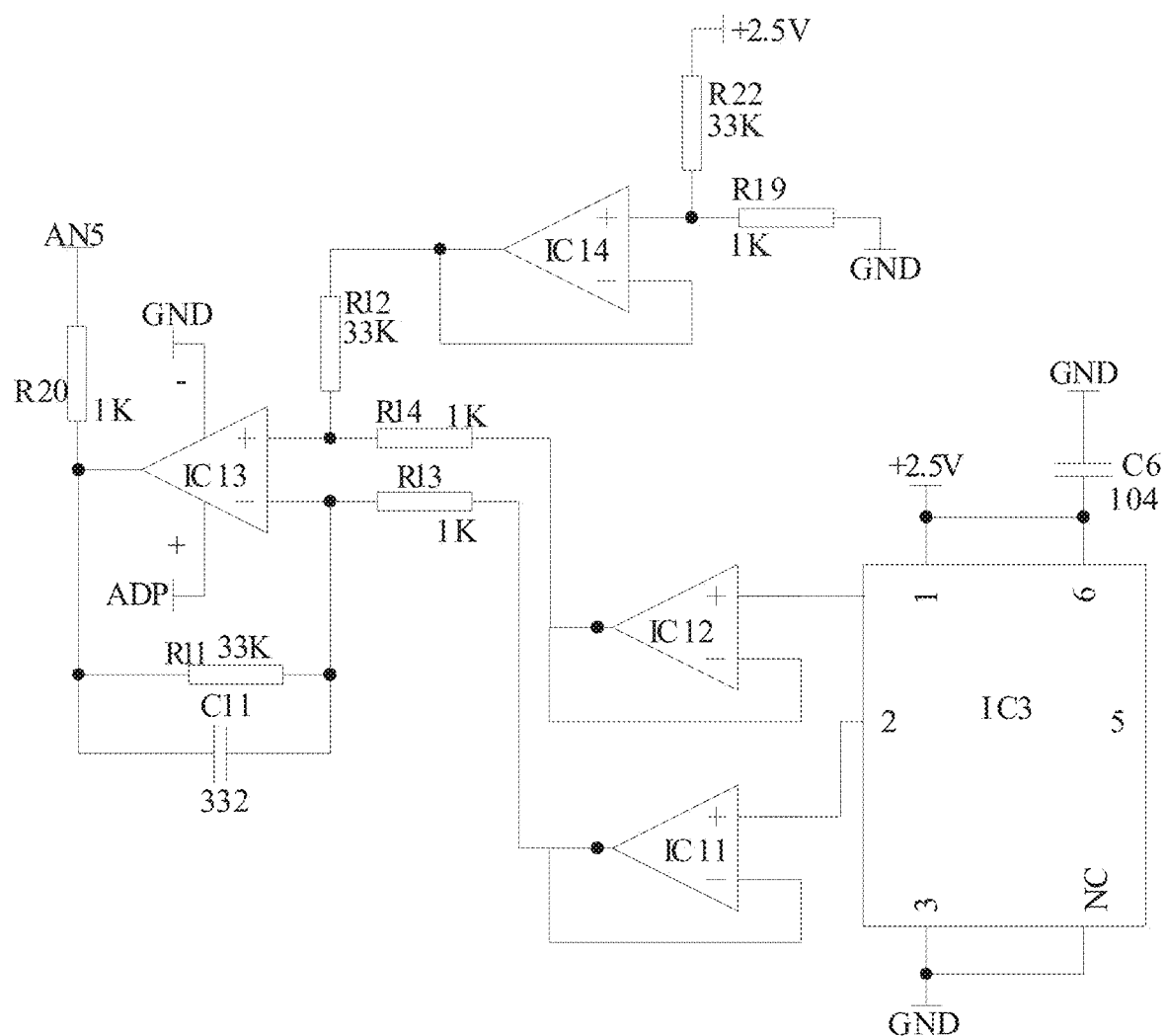
FIG. 8 is a principle diagram illustrating a pressure sensor and a collection circuit according to an example of the present disclosure.
Figure 9:
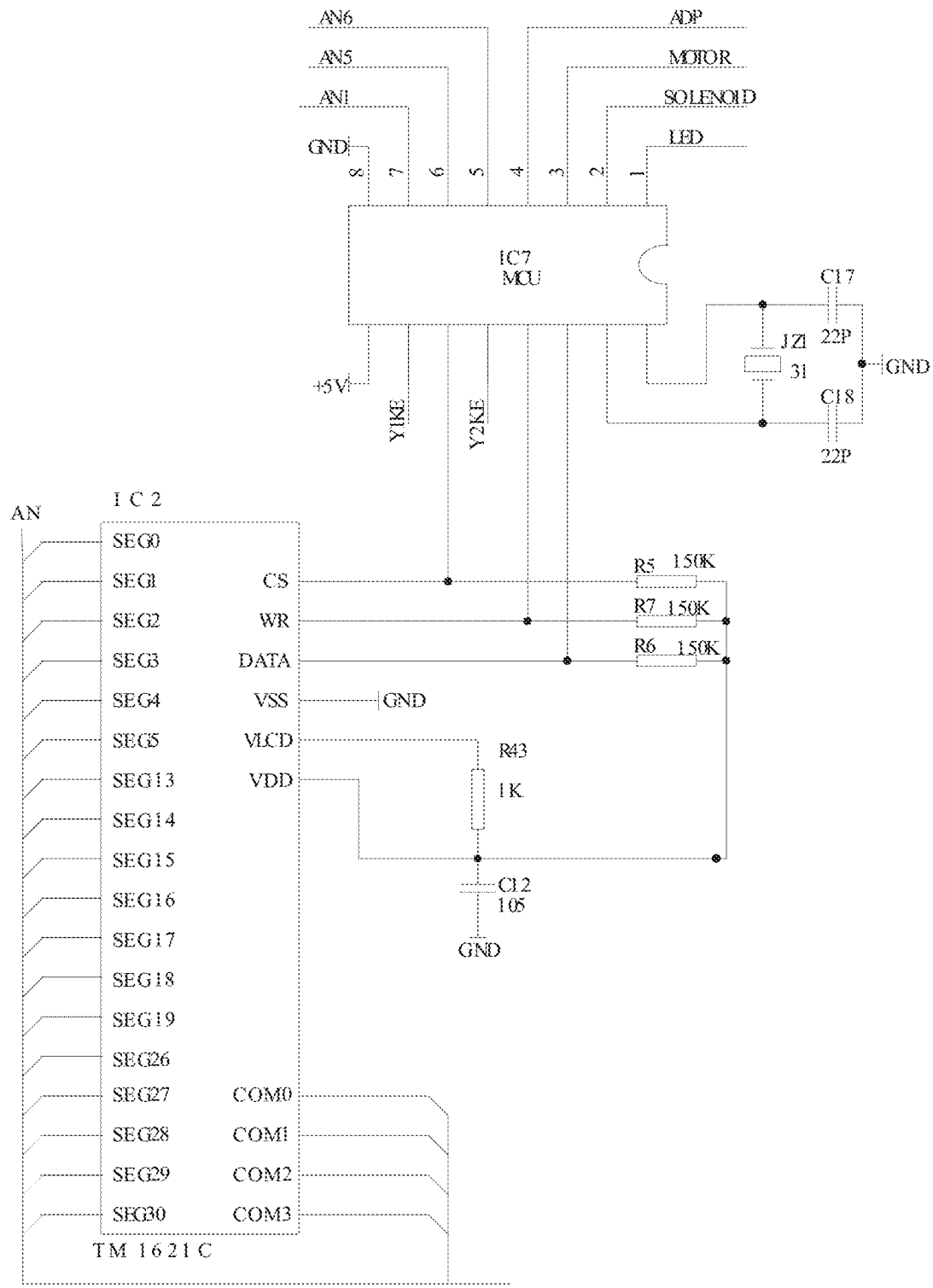
FIG. 9 is a principle diagram illustrating a controller and a collection circuit according to an example of the present disclosure.
Figure 10:
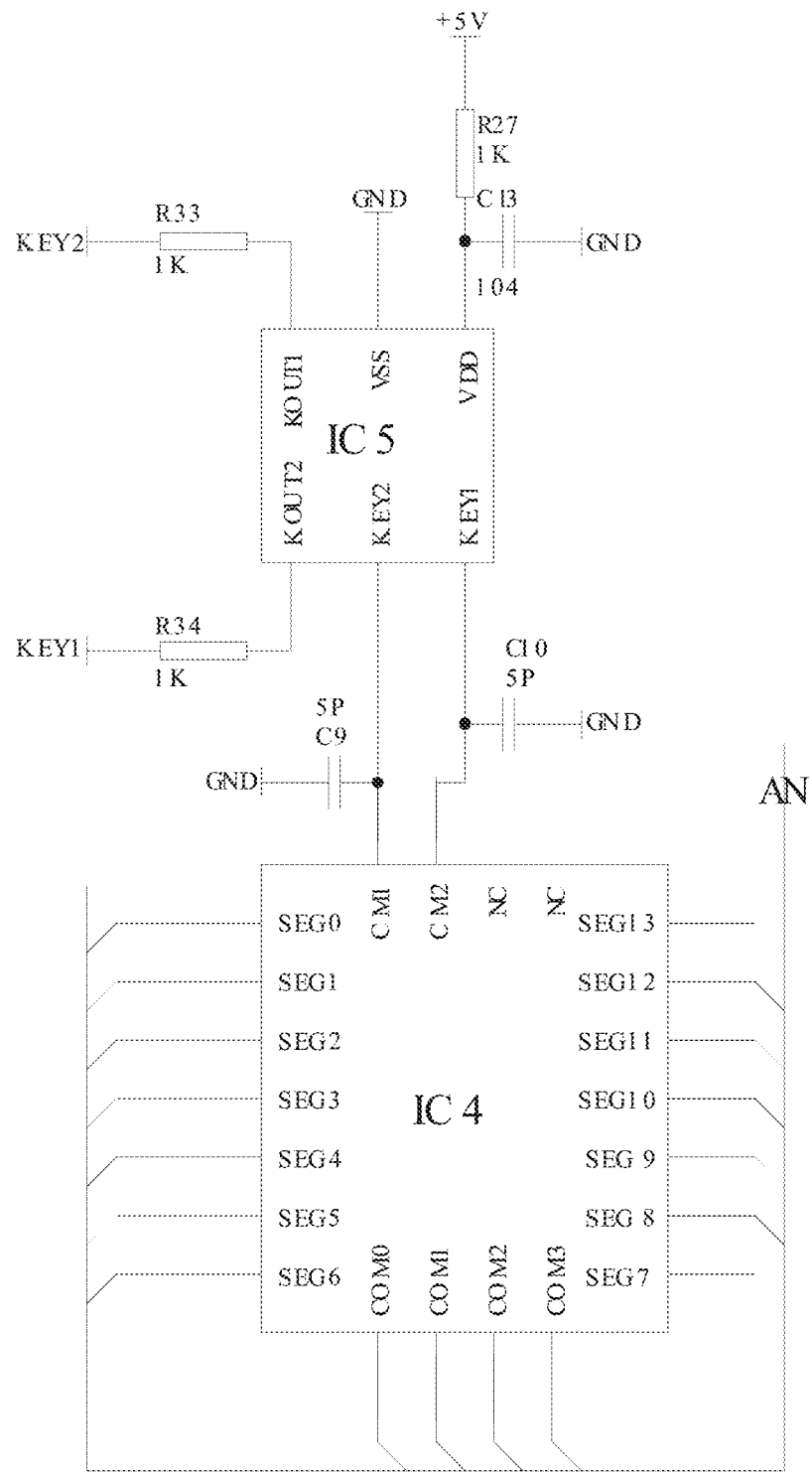
FIG. 10 is a principle diagram illustrating a liquid crystal screen and a touch controller according to an example of the present disclosure.

As shown in FIG. 7, an edge of the top cover is provided with an annular groove with an opening facing down, an edge of the bottom cover is provided with an annular protruding ridge facing up and the protruding ridge is correspondingly mounted in the groove. A circle of expansion water-resistant filling rope is filled in the bottom of the groove, and a sealing rubber ring is mounted outside the expansion water-resistant filling rope. The protruding ridge is provided with a horizontal protruding block and a hole corresponding to the protruding block is opened on a wall of the groove. In the connecting state of the bottom cover and the top cover, the protruding block is located in the hole.

The box cover is also connected with a pressure relief mechanism.

In an implementation (electric driving manner), the pressure relief mechanism includes an electromagnetic valve and a pressure relief air tube; an air inlet of the pressure relief air tube communicates with the storage chamber, and an air outlet of the pressure relief air tube communicates with the atmosphere; the electromagnetic valve is connected to the pressure relief air tube and the controller controls the electromagnetic valve to be turned on and off through the MOS tube switching circuit.

Figure 6:
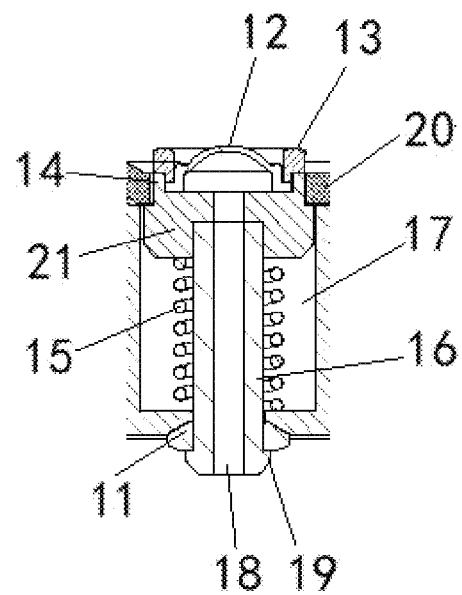
FIG. 6 is a schematic diagram illustrating a sectional structure of an illustrative pressure relief valve according to an example of the present disclosure.

As shown in FIG. 6, in another implementation (mechanical manner), the pressure relief mechanism includes a shell, an air bubble film, a film fixing block, a first venting column, a compression spring and a second venting column.

The shell is connected to the box cover, a top end of the shell exposes at the upper surface of the top cover and a bottom end of the shell is located at the lower surface of the bottom cover.

The cavity of the shell is a cylindrical cavity, and both ends of the cylindrical cavity are provided with a first through hole and a second through hole; the cylindrical cavity communicates with the storage chamber through the first through hole and communicates with the atmosphere through the second through hole.

The second venting column runs through the first through hole of the cylindrical cavity into the cylindrical cavity, the first venting column runs through the second through hole into the cylindrical cavity, the top end of the second venting column is fixed at the bottom end of the first venting column and a venting hole penetrating through the first venting column and the second venting column is opened in the first venting column and the second venting column.

A lower outer wall of the second venting column is provided with a first annular protruding ridge, the outer diameter of the first annular protruding ridge is greater than the inner diameter of the first through hole, a sealing structure is arranged between the first annular protruding ridge and the first through hole, and the first annular protruding ridge is located outside the cylindrical cavity; the compression spring is connected between the second venting column and the cylindrical cavity; a gap is left between the outer wall of the second venting column and the inner wall of the cylindrical cavity.

An opening end of the second through hole is connected with a bending edge facing an axis of the cylindrical cavity, and an inner diameter of a circular through hole enclosed by the bending edge is less than the inner diameter of the cylindrical cavity.

A second annular protruding ridge is connected at a lower outer wall of the first venting column, the second annular protruding ridge is located in the cylindrical cavity and a sealing structure is connected between a top surface of the second annular protruding ridge and a bottom surface of the bending edge.

An outer diameter of the first venting column is less than the inner diameter of the circular through hole, and an outer diameter of the second annular protruding ridge is less than the inner diameter of the cylindrical cavity and greater than the inner diameter of the circular through hole.

The air bubble film is covered on a top surface of the first venting column, the top surface of the first venting column is provided with a recess and an opening of the venting hole is located on the surface of the recess, and a gap is left between the bottom surface of the air bubble film and the surface of the recess; the film fixing block is annular, the film fixing block is pressed on the edge of the air bubble film and the edge of the air bubble film is sealingly connected with the recess.

The air bubble film is an elastic film made of an elastic material. In a normal state, the air bubble film bulges in the middle. When a bottom surface pressure of the air bubble film is less than a top surface pressure, the air bubble film is recessed in the middle; the middle position of the air bubble film is in the hollow of the annular film fixing block.

When the elastic potential energy of the compression spring is minimum, sealing is performed between the first annular protruding ridge and the first through hole and sealing is performed between the second annular protruding ridge and the bottom surface of the bending edge.

Example 2

An operation method of the touch display screen in the example 1 includes:

automatically setting a pressure parameter: well connecting a negative pressure measuring standard gauge and covering it well, clicking "POWER" button three times so that "88.8" is displayed in the middle digits, and pressing "SET" button so that the digit on the upper row is added by 1, and releasing and pressing again until 5 is displayed;

pressing POWER button to restore factory settings: automatically setting a maximum pressure to −22 KPa and a minimum pressure to −15 KPa and saving them;

at the time of negative pressure, timing is started, where the first row of green digits on the LCD screen displays accumulated time (hours); at the time of no negative pressure, timing is cleared to zero;

the second row of digits displays a current pressure (−Kpa);

long pressing "SET" button, where the upper row displays a lower limit of a set pressure;

long pressing "POWER" button, where the upper row displays an upper limit of a set pressure and displays a battery voltage value (/100V) after five seconds;

double clicking "POWER" button to turn on or off the working state of the air pump, where, when the motor is started and a pressure reaches the set upper limit, the air pump stops automatically; when the pressure reaches the set lower limit, the air pump will be run automatically until the pressure reaches to the upper limit;

when the motor is in a working state, the "KPa" mark will flash and when the motor stops, the mark will be always on;

double clicking "SET" button to cancel the working state of the motor, connecting the electromagnetic valve to release air until air pressure drops to 0.1 KPa or stopping the electromagnetic valve after another two seconds following 20 seconds, where the "Kpa" mark is not on during air release;

after a user releases the pressure and uncovers to place or take articles, if it is desired to pressurize again, double-clicking "POWER" button to re-start;

user settings: clicking "POWER" button three times so that "88.8" is displayed in the middle and pressing SET button again to add 1 to the upper row of digits and releasing and pressing again until 3 is displayed;

pressing "POWER" button to set the upper and lower limits: the flash above the two second points represents an upper limit of pressure to be set and the flash below the two second points represents a lower limit of pressure to be set; pressure may be increased by pressing "SET" button or decreased by pressing "POWER" button after pressing and holding "SET" button;

after completing settings, long-pressing "POWER" button until two rows of digits display "0" and "0.0" and then returning to a working state;

battery level display: full levels are on in case of above 4.2V, three levels are on in case of 3.9V-4.2V, two levels are on in case of 3.7V-3.9V, one level is on in case of 3.6V-3.7V, and off in case of lower than 3.5V-3.6V, and a battery box flashes in case of lower than 3.5V;

when the screen automatically goes off in case of no button operation within 25 seconds, pressing the buttons "POWER" and "SET" at the same time and holding them for more than 0.5 seconds to turn on the LCD screen;

giving an alarm when no pressure is reached within 60 seconds: the display screen flashes three times a second and is exited by pressing any button;

"P-" is always on, which corresponds to an off state; at this time, the motor will not be started automatically; when "P-" flashes, it indicates a running state and the motor will maintain the air pressure between the set maximum and the set minimum.

Apparently, the above examples are merely for the purpose of describing the present disclosure clearly rather than limiting the implementations of the present disclosure. Those skilled in the art may also make another other changes or variations based on the above descriptions. Herein, all examples cannot be exhausted. Those apparent changes or variations derived from the spirits of the present disclosure shall all fall within the scope of protection of the present disclosure.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An automatic air-extracting sealing box cover, comprising:
 a bottom cover; and
 a top cover that are mutually and detachably connected, wherein
 the bottom cover and the top cover are connected to form a device chamber, and an automatic air-extracting apparatus is mounted in the device chamber; and
 the automatic air-extracting apparatus comprises a pressure sensor; an air pump and a controller, wherein an air extracting opening of the air pump and a probe of the pressure sensor project out of a lower surface of the bottom cover; an output end of the pressure sensor is connected to a collection circuit, and an output end of the collection circuit is connected to a pressure signal input end of the controller; a control signal output end of the controller is connected to an on/off control end of the air pump.

2. The automatic air-extracting sealing box cover according to claim 1, wherein the collection circuit comprises a first operational amplifier (IC11) and a second operational amplifier (IC12); a first signal output end and a second signal output end of the pressure sensor are connected respectively to in-phase ends of the first operational amplifier and the second operational amplifier, out-phase ends of the first operational amplifier and the second operational amplifier are connected respectively to output ends of the first operational amplifier and the second operational amplifier; the output ends of the first operational amplifier and the second operational amplifier are connected in series respectively to a first voltage dropping resistor and a second voltage dropping resistor (R13 and R14) and then connected to an out-phase end and an in-phase end of a third operational amplifier, and an output end of the third operational amplifier is connected in series to a third voltage dropping resistor (R20) and then connected to the pressure signal input end of the controller; an RC parallel circuit is provided between the out-phase end and the output end of the third operational amplifier (IC13); an output end of a fourth operational amplifier (IC14) is connected in series to a fourth voltage dropping resistor (R12) and then connected to the in-phase end of the third operational amplifier, and the out-phase end and the output end of the fourth operational amplifier (IC14) are connected; a first voltage dividing resistor and a second voltage dividing resistor are connected in series between +2.5V direct current power source end and a grounding end, and an in-phase end of the fourth operational amplifier (IC14) is connected to the connecting ends of the first voltage dividing resistor and the second voltage dividing resistor.

3. The automatic air-extracting sealing box cover according to claim 2, wherein the controller is a single chip microcomputer, the controller is connected with a touch display screen; the touch display screen comprises a liquid crystal screen driving circuit connected with the above controller, a liquid crystal screen connected with an output end of the liquid crystal screen driving circuit, and a touch controller connected with a touch control signal input end of the liquid crystal screen.

4. The automatic air-extracting sealing box cover according to claim 1, wherein the controller controls the air pump through a MOS tube switching circuit.

5. The automatic air-extracting sealing box cover according to claim 4, further comprising a human-machine interaction module, wherein a signal output end of the human-machine interaction module is connected to a human-machine interaction signal input end of a microcontroller; an signal input end of the human-machine interaction module is connected to a human-machine interaction signal output end of the microcontroller.

6. The automatic air-extracting sealing box cover according to claim 4, further comprising:
a communication unit, wherein a signal output end of the communication unit is connected to a communication signal input end of the microcontroller;
a signal input end of the communication unit is connected a communication signal output end of the microcontroller;
an output end of the power source is connected to a power source input end of the communication unit; and
the communication unit is a Bluetooth communication module and/or a WWI communication module.

7. The automatic air-extracting sealing box cover according to claim 5, wherein an upper surface of the bottom cover is provided with a grid for placing the pressure sensor body, a through hole is opened on a bottom surface of the grid, a probe of the pressure sensor communicates with the lower surface of the bottom cover through the through hole, the grid is filled with pouring sealant and a wire of the pressure sensor projects out of the pouring sealant body;
the upper surface of the bottom cover is provided with a fixing position for placing the air pump, the air pump is fixed in the fixing position and an elastic isolation pad is connected between a housing of the air pump and the fixing position;
the human-machine interaction module is a touch display screen; a hollow frame is opened on the top cover, the touch display screen is located in the hollow frame, and an elastic sealing material is filled between an edge of the touch display screen and an inner edge of the hollow frame;
a PCB board where the controller is located is fixed at the upper surface of the bottom cover; and
the power source is a battery detachably connected into a positioning groove of the upper surface of the bottom cover.

8. The automatic air-extracting sealing box cover according to claim 1, wherein an edge of the top cover is provided with an annular groove with an opening facing down and an edge of the bottom cover is provided with an annular protruding ridge facing up, the protruding ridge is correspondingly mounted in the groove, a circle of expansion water-resistant filling rope is filled in the bottom of the groove and a sealing rubber ring is mounted outside the expansion water-resistant filling rope; and
the protruding ridge is provided with a horizontal protruding block, a hole corresponding to the protruding block is opened on a wall of the groove, and the protruding block is located in the hole in the connecting state of the bottom cover and the top cover.

9. The automatic air-extracting sealing box cover according to claim 1, wherein the sealing box cover is further connected with a pressure relief mechanism; the pressure relief mechanism comprises an electromagnetic valve and a pressure relief air tube; an air inlet of the pressure relief air tube communicates with a lower surface of the bottom cover, and an air outlet of the pressure relief air tube communicates with the atmosphere; the electromagnetic valve is connected with the pressure relief air tube, and the controller controls the electromagnetic valve to be turned on and off through a MOS tube switching circuit;
alternatively, the pressure relief mechanism comprises a shell, a air bubble film, a film fixing block, a first venting column, a compression spring and a second venting column;
the shell is connected to the box cover, a top end of the shell exposes on the upper surface of the top cover, and a bottom end of the shell is located at the lower surface of the bottom cover;
a cavity of the shell is a cylindrical cavity, a first through hole and a second through hole are opened at both ends of the cylindrical cavity; the cylindrical cavity communicates with the lower surface of the bottom cover through the first through hole and communicates with the atmosphere through the second through hole;
the second venting column runs through the first through hole of the cylindrical cavity into the cylindrical cavity, and the first venting column runs through the second through hole into the cylindrical cavity, a top end of the second venting column is fixed at a bottom end of the first venting column, and a venting hole penetrating through the first venting column and the second venting column is opened in the first venting column and the second venting column;
a first annular protruding ridge is provided at a lower outer wall of the second venting column, an outer diameter of the first annular protruding ridge is greater than an inner diameter of the first through hole; a sealing structure is provided between the first annular protruding ridge and the first through hole, and the first annular protruding ridge is located outside the cylindrical cavity; the compression spring is connected between the second venting column and the cylindrical cavity; a gap is left between an outer wall of the second venting column and an inner wall of the cylindrical cavity;

an opening end of the second through hole is connected with a bending edge facing an axis of the cylindrical cavity and an inner diameter of a circular through hole enclosed by the bending edge is less than an inner diameter of the cylindrical cavity;

a second annular protruding ridge is connected at a lower outer wall of the first venting column, the second annular protruding ridge is located in the cylindrical cavity and a sealing structure is provided between a top surface of the second annular protruding ridge and a bottom surface of the bending edge;

an outer diameter of the first venting column is less than the inner diameter of the circular through hole, the outer diameter of the second annular protruding ridge is less than the inner diameter of the cylindrical cavity and greater than the inner diameter of the circular through hole;

the air bubble film is covered on a top surface of the first venting column, the top surface of the first venting column is provided with a recess, the opening of the venting hole is located at the surface of the recess, a gap is left between the bottom surface of the air bubble film and the surface of the recess; the film fixing block is annular, the film fixing block is pressed on an edge of the air bubble film, and the edge of the air bubble film is sealingly connected with the recess;

the air bubble film is an elastic film made of an elastic material; and in a normal state, the air bubble film bulges in the middle; and when a bottom surface pressure of the air bubble film is less than a top surface pressure, the air bubble film is recessed in the middle; the middle position of the air bubble film is in the hollow of the annular film fixing block; and when the elastic potential energy of the compression spring is minimum, sealing is performed between the first annular protruding ridge and the first through hole and sealing is performed between the second annular protruding ridge and the bottom surface of the bending edge.

10. The automatic air-extracting sealing box cover according to claim 6, wherein an upper surface of the bottom cover is provided with a grid for placing the pressure sensor body, a through hole is opened on a bottom surface of the grid, a probe of the pressure sensor communicates with the lower surface of the bottom cover through the through hole, the grid is filled with pouring sealant and a wire of the pressure sensor projects out of the pouring sealant body;

the upper surface of the bottom cover is provided with a fixing position for placing the air pump, the air pump is fixed in the fixing position and an elastic isolation pad is connected between a housing of the air pump and the fixing position;

the human-machine interaction module is a touch display screen; a hollow frame is opened on the top cover, the touch display screen is located in the hollow frame, and an elastic sealing material is filled between an edge of the touch display screen and an inner edge of the hollow frame;

a PCB board where the controller is located is fixed at the upper surface of the bottom cover; and the power source is a battery detachably connected into a positioning groove of the upper surface of the bottom cover.

11. A working method of the automatic air-extracting sealing box cover according to claim 1, wherein when a motor is started and a pressure reaches a set upper limit; the box cover stops automatically; when the pressure reaches a set lower limit, an air pump is automatically run until the pressure reaches the upper limit.

\* \* \* \* \*